US005708574A

United States Patent [19]

Crompton

[11] Patent Number: 5,708,574

[45] Date of Patent: Jan. 13, 1998

[54] ADAPTIVE POWER DIRECT CURRENT PREREGULATOR

[75] Inventor: Jeffrey S. Crompton, North Hills, Pa.

[73] Assignee: General Instrument Corporation, Hatboro, Pa.

[21] Appl. No.: 670,990

[22] Filed: Jun. 28, 1996

Related U.S. Application Data

[63] Continuation of Ser. No. 392,362, Feb. 22, 1995, abandoned.

[51] Int. Cl.[6] .......................... H02H 7/125; H02M 5/42; G05F 1/44

[52] U.S. Cl. .............................. 363/53; 363/89; 323/266

[58] Field of Search ................................ 363/52, 53, 54, 363/59, 18, 100, 74, 93, 126, 89, 124; 323/266, 284

[56] References Cited

U.S. PATENT DOCUMENTS

| | | | |
|---|---|---|---|
| 3,582,713 | 6/1971 | Till | 317/31 |
| 3,582,718 | 6/1971 | Spellman | 317/148.5 |
| 3,893,006 | 7/1975 | Algeri et al. | 317/3 |
| 3,999,113 | 12/1976 | McCoy | 321/12 |
| 4,074,182 | 2/1978 | Weischedel | 323/25 |
| 4,367,557 | 1/1983 | Stern et al. | 455/4 |
| 4,754,388 | 6/1988 | Pospisil | 363/54 |
| 4,955,069 | 9/1990 | Ionescu | 388/811 |
| 5,138,547 | 8/1992 | Swoboda | 363/53 |
| 5,241,260 | 8/1993 | Beland | 323/270 |
| 5,359,281 | 10/1994 | Barrow et al. | 323/284 |

*Primary Examiner*—Peter S. Wong
*Assistant Examiner*—Bao Q. Vu
*Attorney, Agent, or Firm*—Volpe and Koenig, P.C.

[57] ABSTRACT

A direct current (dc) overvoltage, pre-regulation circuit regulates dc voltage supplied to a cable television line amplifier. The circuit provides overvoltage protection while permitting continuous operation of the line amplifier. The circuit opens the input to the downstream continuous voltage regulation circuit and cyclically charges a filter storage capacitor by periodic applications of the un-clipped voltage. The repeated switching regulates the dc voltage such that operation is sustained during periods of overvoltage that would normally shut down conventional circuits. No overall feedback is required to control the active device.

24 Claims, 4 Drawing Sheets

ADAPTIVE POWER dc PRE-REGULATOR

ADAPTIVE POWER DIRECT CURRENT PREREGULATOR

This application is a continuation, of application Ser. No. 08/392,362, filed Feb. 22, 1995, now abandoned.

FIELD OF THE INVENTION

The present invention relates to devices for regulating voltage. In particular, the present invention pertains to a device which pre-regulates voltage from a dc voltage source before a first stage filter. More particularly, the present invention is directed to a device which pre-regulates voltage to the power supply of a cable television radio frequency (RF) line amplifier to permit uninterrupted operation during mains ac overvoltage conditions.

BACKGROUND OF THE INVENTION

Electric utility companies have generally provided consumers with a reliable source of electrical power to meet their demands. However, utilities cannot guarantee that the voltage of the power supplied will remain constant as it is distributed over the electrical distribution network. The line voltage may exhibit variations due to a variety of causes. Consumer demand may degrade the voltage across the entire electrical grid, as experienced during a brownout. Energization and deenergization of electrical equipment may also cause fluctuations in voltage. Portions of the grid are frequently subject to electrical transients caused by lightening strikes, fallen power lines and other electrical faults.

Electricity output from utility generating stations is high-voltage, three-phase alternating current, where a 120° angular relationship is maintained between each phase. The electrical distribution system maintains the three-phase configuration until lower voltage single-phase power is required. The voltage is reduced by transformers placed throughout the electrical distribution system.

One method employed to reduce three-phase voltage levels is by using a Delta to Y (A-Y) transformer which creates a common neutral and ground between all three phases. Electrical loads placed on a three-phase system must be balanced with regard to inductive, capacitive, and resistive characteristics for each individual phase. When the respective loads are balanced, ground path currents are low. If one or more phases of a three-phase system are open or short circuited, or degraded, the result is a phase-to-phase imbalance which elevates currents in the ground path. The current-resistance (IR) drop through the ground conductor will manifest itself as an increase in the potential difference between the normal ground potential and the supply voltage, thus appearing as an overvoltage condition.

A ground conductor experiencing fault currents tied to a system neutral will impress the resulting overvoltage condition on the neutral conductor. The overvoltage condition will be experienced by devices connected to the neutral conductor in close proximity to the fault.

Cable television line amplifiers are suspended by the signal carrying coaxial cable support strand between telephone poles and are powered from the signal coax. Typically, the common ground path used by the utility is tied to the outer cable sheath that also serves as the neutral conductor for the cable television company. A ground fault in close proximity to the ground-neutral common connection elevates the neutral conductor potential for a distance from that fault location until the energy sufficiently dissipates. The overvoltage is manifest between the center conductor and shield of the coaxial cable. This overvoltage can persist up to a ten pole distance on either side of the fault location.

Overvoltage protection devices currently utilized within line amplifier power supplies isolate the power supply during the overvoltage condition to prevent damage to the amplifiers. Prior art overvoltage protection circuits either open the circuit, clamp the output of the power supply to a safe level, or crowbar the ac input by placing a low-voltage short circuit across the input of the power supply while the overvoltage persists thereby providing protection. During the operation of overvoltage protection devices, downstream circuitry within an electronic device is removed from the current path or shunted, thereby interrupting operation of the electronic device.

FIG. 2, shows a prior art switching voltage regulator. A voltage regulator delivers a constant output voltage even though the input voltage to the circuit and current drawn from the regulator may vary. A N-channel depletion MOSFET (metal-oxide semiconductor field-effect transistor) 135 provides the current switching action. Resistors 150, 155 and comparator 145 provide the feedback signal from the output of the voltage regulator. A reference voltage is compared to the feedback voltage and an error signal is outputted to oscillator 140, which adjusts the switching rate or duty cycle of the regulator to conform to the voltage reference signal. The circuit continuously regulates the input voltage to that of the reference, however, no overvoltage protection is provided.

FIG. 3 is an overvoltage clamping circuit which is well known in the prior art. The active element is a Zener diode 160 in series with current limiting resistor 165. This combination determines the overvoltage at which the circuit activates. As the potential difference across terminals 170 and 180 increases above the Zener breakdown voltage of Zener diode 160, current will flow and turn-on npn pass transistor 175, thereby shunting and dissipating the energy between terminals 170 and 180. Although the "clamping" action provides the overvoltage protection, the downstream electronic device will be inoperable for the duration of the overvoltage condition.

Although brief interruptions may be acceptable for cable television systems which provide only entertainment services, cable television systems have been increasingly used for life-saving services and critical information exchanges. Cable television system interruptions, therefore, are no longer tolerable. Accordingly, there is a need for an overvoltage protection circuit which permits continuous operation of the downstream electronic device while providing adequate protection during an overvoltage event.

SUMMARY OF THE INVENTION

The present invention provides a direct current (dc) overvoltage, pre-regulation circuit that regulates dc voltage supplied to a cable television line amplifier. The invention utilizes an overvoltage regulation means in combination with a switching regulator means to provide overvoltage protection at considerably higher voltage levels while permitting continuous operation of the line amplifiers. The circuit operates by opening the input to the downstream continuous voltage regulation circuit and cyclically charging a filter storage capacitor by periodic applications of the un-clipped voltage during an overvoltage event. The filter capacitor is part of the continuous voltage regulation circuit and becomes the voltage source to the downstream circuitry between full-wave rectification peaks. Due to full-wave rectification, the cyclic charging rate is double the line frequency during the overvoltage event. No overall feedback is required to control the active device. The repeated switching of the current regulates the dc voltage such that operation is sustained during periods of overvoltage that would normally shut down conventional circuits.

Accordingly, it is an object of the present invention to provide means for pre-regulating a power supply during an overvoltage condition to allow continuous operation of the line amplifier.

It is a further object of the invention to provide an inexpensive and simple means for pre-regulating the dc voltage of a power supply during extreme and continuous overvoltage durations.

Further objects and advantages of the invention will become apparent to those of ordinary skill in the art after reading the detailed description of the preferred embodiment.

DESCRIPTION OF THE PREFERRED EMBODIMENT

Figure 1:
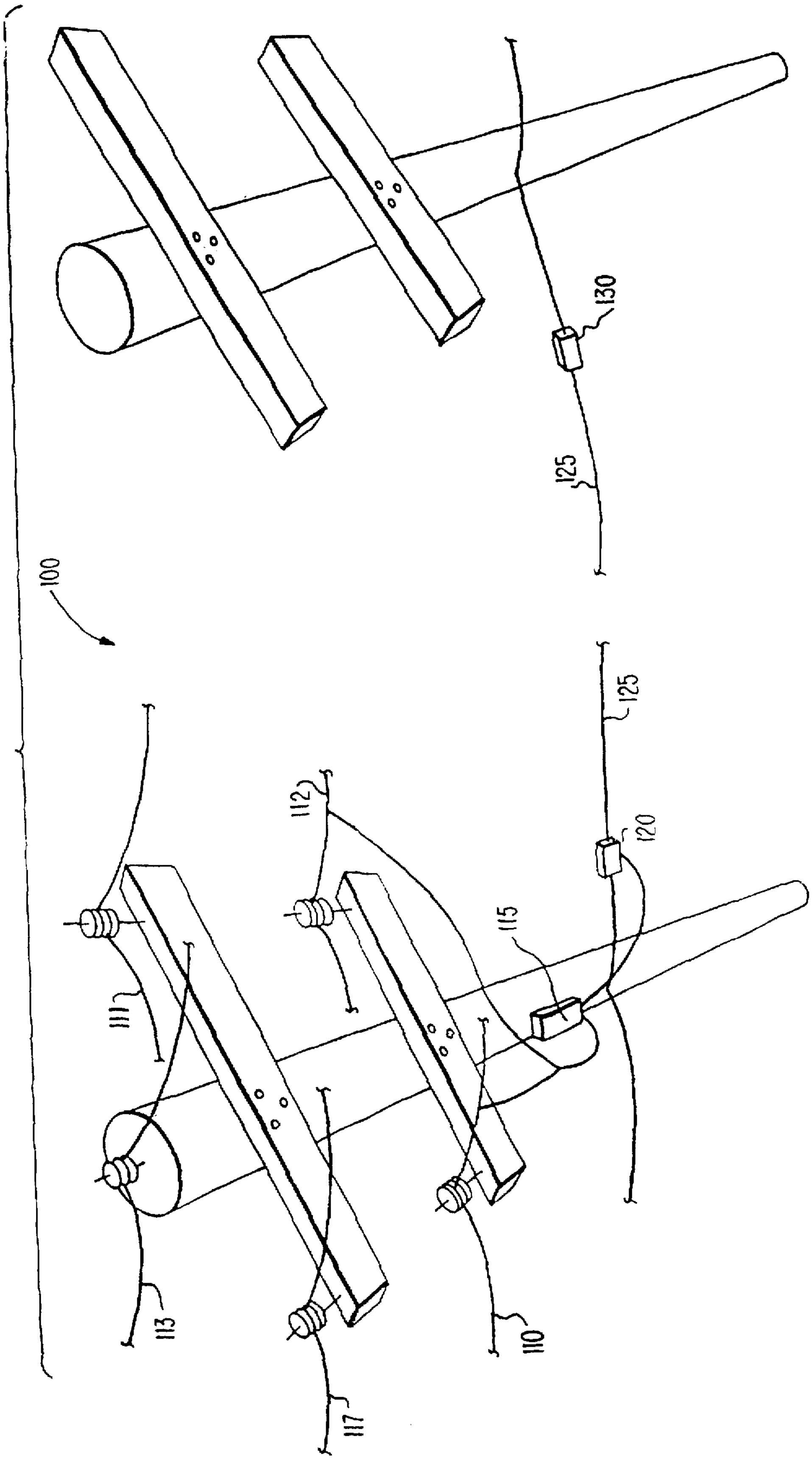
FIG. 1 is a perspective view of the telephone pole mounted cable television components.
Figure 2:
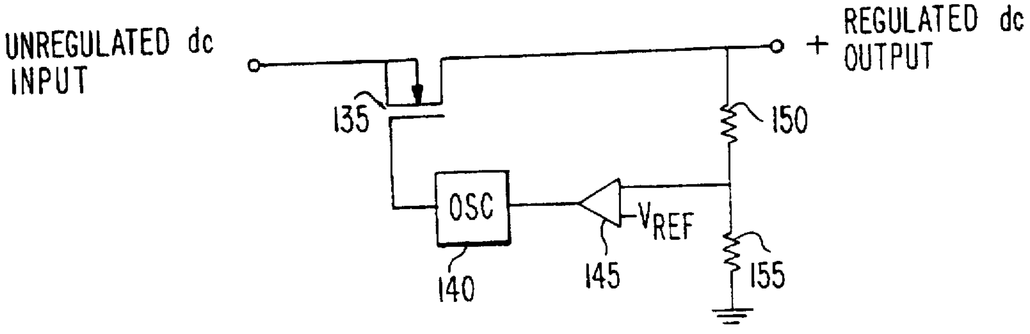
FIG. 2 PRIOR ART
FIG. 2 is a simplified electrical schematic of a prior art switching regulator.
Figure 3:
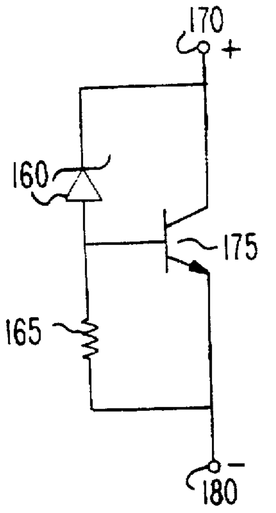
FIG. 3 PRIOR ART
FIG. 3 is a simplified electrical schematic of a prior art overvoltage clamp circuit.
Figure 4A:
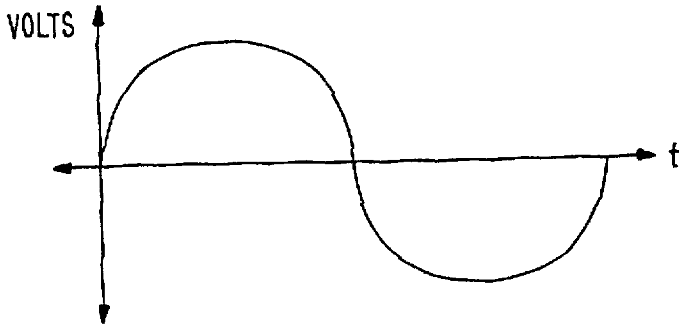
FIG. 4A is a graph of the single-phase voltage supplied from the utility.
Figure 4B:
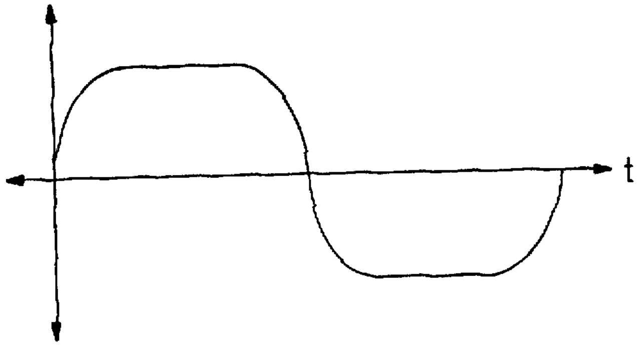
FIG. 4B is a graph of the quasi-square wave voltage output from a ferroresonant transformer.

A cable television (CATV) communication system 1 utilizing the present invention is shown in FIG. 1. Three high tension conductors 111, 113, 117 carry three-phase high-voltage power from the electric utility to remote consumers. Line conductor 110 supplies single-phase 120 Vac line voltage to local consumers. Neutral conductor 112 provides the return path and connection to the utility ground. The 120 Vac line voltage 110, as shown in FIG. 4A, is a 60 cycle sinusoid. The voltage is reduced and regulated by means of a pole-mounted, ferroresonant voltage regulating transformer 115, which outputs 60 Vac 60 cycle quasi-square wave and can source up to 15 Amperes of current as shown in FIG. 4B. Referring again to FIG. 1, the reduced and regulated ac voltage is inserted in the cable television signal carrying coaxial cable 125 via cable television power inserter 120. The single-phase line conductor 110 in conjunction with neutral conductor 112 supply power to the CATV communication system 100.

The coaxial cable 125 supports communications between the headend of the CATV communication system 100 and a plurality of subscribers by transmitting the RF signals. Since the RF signals within the coaxial cable 125 become attenuated over long distances, CATV line amplifiers 130 must be inserted at specific locations within the CATV communication system 100 to maintain minimum signal levels.

Figure 6:
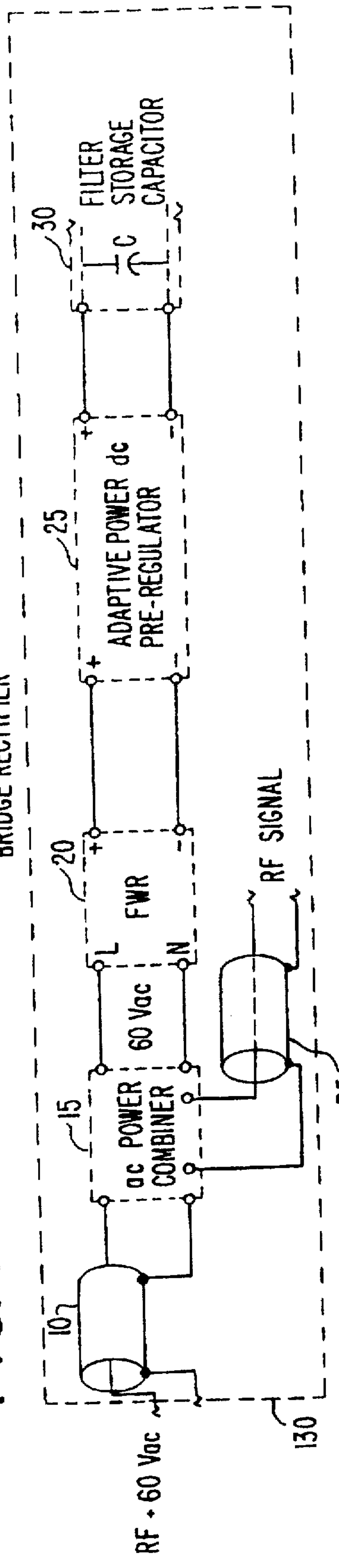
FIG. 6 is a block diagram of the present invention used in a typical application.

Referring to FIG. 6, a 60 Vac 60 cycle quasi-square wave is imposed on the RF signal conductor 10. Line amplifier 130 first separates the RF signal and 60 Vac with the ac power combiner 15. With the ac voltage component removed, the RF signal 35 can be amplified by the line amplifier. A suitable line amplifier for this application is Model Number BLE-750 series manufactured by General Instrument Corporation.

The 60 Vac is full-wave rectified by rectifier 20 and is then pre-regulated by the pre-regulator 25 of the present invention. After pre-regulation, the voltage is applied to the filter storage capacitor 30 for further voltage regulation and reduction by the line amplifier 130.

Figure 4C:
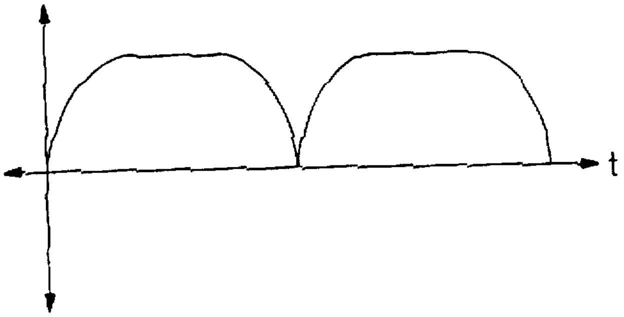
FIG. 4C is a graph of the voltage output from the full-wave rectifier.
Figure 5:
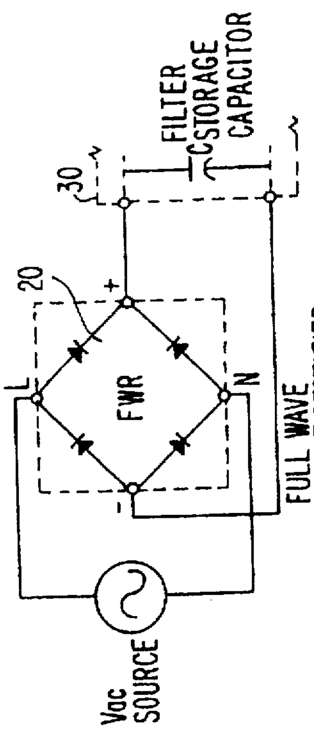
FIG. 5 PRIOR ART
FIG. 5 is a simplified electrical schematic of a prior art direct current power supply.

A typical cable television line amplifier dc power supply is shown in FIG. 5. The ac voltage, as shown in FIG. 4B, is applied to the terminals of a full-wave bridge rectifier 20 comprised of four rectifiers. The output is full-wave rectified dc as shown in FIG. 4C.

The unfiltered output voltage fluctuates about an average value as the successive pulses of energy determined by the line frequency are delivered to the load. The output of the rectifier is composed of a direct voltage component and an alternating or ripple voltage component. The frequency of the main component of the ripple for the full-wave rectifier shown in FIG. 4C, is twice the frequency of the voltage that is being rectified, in this case 120 cycles. This pulsating voltage is applied to a filter storage capacitor which is charged to the peak voltage of the rectifier within a few cycles. The charge on the capacitor represents a storage of energy, and consequently the amplitude of the ripple is greatly reduced. At this point, the voltage across capacitor 30 is stabilized, shown in FIG. 4D. Although the power supply of FIG. 5 is full-wave rectified, it does not provide overvoltage protection.

Figure 7:
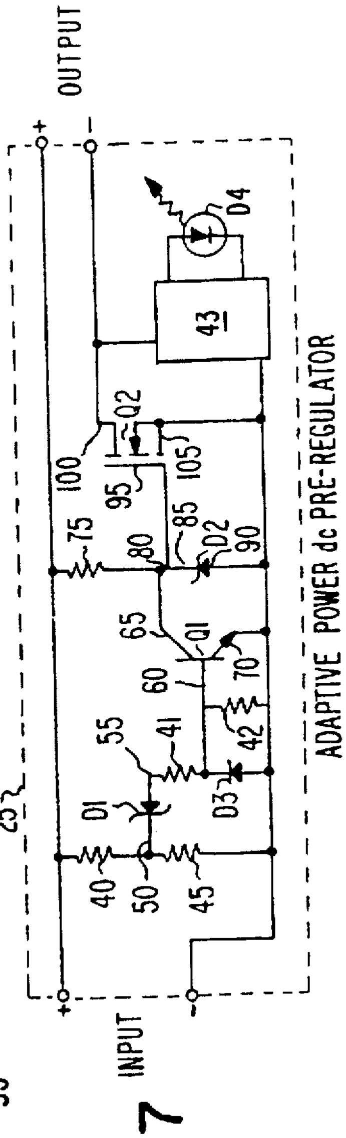
FIG. 7 is an electrical plan of the adaptive power direct current pre-regulator.

Referring to FIG. 7, the preferred embodiment of the adaptive power pre-regulator 25 is shown. The pre-regulator 25 is located within a power supply with an input from a full-wave bridge rectifier and an output to a filter storage capacitor. The pre-regulator 25 includes two transistors, Q1 and Q2. Transistor Q2 is an N-channel enhancement power MOSFET with the source 105 connected to the negative leg of the full wave rectifier 20 and the drain 100 connected to the negative terminal of filter storage capacitor 30. An LED (light emitting diode) D4 is driven by a high input impedance voltage comparator 43 connected across the source 105 and drain 100 of transistor Q2. Under normal voltage conditions, the transistor Q1 is held in a state of conduction by a bias circuit comprised of a current limiting resistor 75 and a Zener diode D2 in a shunt regulator configuration. Resistor 75 and diode D2 are connected in series, with one side of resistor 75 connected to the positive leg of the full wave rectifier 20 and the other side of resistor 75 connected to the cathode 85 of diode D2. The anode 90 of diode D2 is connected to the negative leg of the full-wave rectifier 20. The common electrical node 80 between resistor 75 and diode D2 is connected to the gate 95 of transistor Q2. This combination allows a constant voltage to be impressed on the gate 95 of transistor Q2.

Transistor Q2 is controlled by a small signal, npn transistor Q1. Transistor Q1 is controlled by Zener diode D1 and a voltage divider comprising two resistors 40, 45 that monitor the voltage across storage capacitor 30. The resistors 40, 45 are connected in series across the output of the full-wave rectifier 20. The cathode 50 of diode D1 is connected to the common electrical node between resistors 40, 45. The anode 55 of diode D1 is connected to one side of a base bias voltage divider comprising resistors 42. Resistors 41 and 42 are connected in series between anode 55 of diode D1 and the negative leg of full-wave rectifier 20. The base 60 of transistor Q1 and the cathode of protection diode D3 are connected to the common electrical node between resistors 41, 42. The anode of protection diode D3 and emitter 70 of transistor Q1 are connected to the negative leg of full-wave rectifier 20. The collector 65 of transistor Q1 is connected to the common electrical node 80 of resistor 75, diode D2 and gate 95 of transistor Q2. The component values of the preferred embodiment are shown in Table 1.

TABLE 1

| COMPONENT | SPECIFICATIONS |
|---|---|
| D1 | 5.1 Volt, 1 Watt Zener |
| D2 | 18 Volt, 1 Watt Zener |
| D3 | 1n4148 |
| D4 | 2mA HLMP-3750 |
| Q1 | IRF840 N-channel MOSFET |
| Q2 | 2n3904 npn switching transistor |
| 40 | 160 kΩ, 2 Watt |
| 41 | 1 kΩ, ½ Watt |
| 42 | 10 kΩ, ½ Watt |
| 45 | 6.8 kΩ, ½ Watt |
| 75 | 150 kΩ, 2 Watt |

Figure 4D:
FIG. 4D is a graph of the voltage across the capacitor during normal voltage operation.

Under normal voltage conditions, as shown in FIG. 4D, the voltage drop across resistor 45 is not enough to allow current to flow through diode D1 and across the base 60 emitter 65 junction of transistor Q1. Therefore, transistor Q1 remains turned-off. The voltage at node 80 is sufficient to keep Q2 turned-on. Since the potential difference across source 105 and drain 100 is near zero when transistor Q2 is turned-on, voltage comparator 43 does not illuminate LED D4.

Figure 4E:
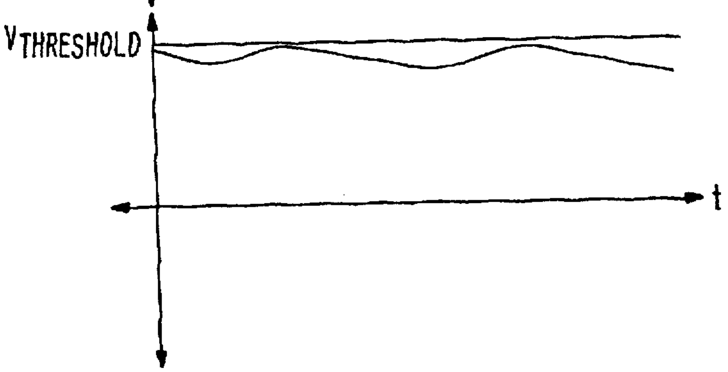
FIG. 4E is a graph of the voltage across the capacitor during overvoltage conditions.

During an overvoltage event, as shown in FIG. 4E, the overvoltage threshold value as determined by voltage divider resistors 40 and 45, and diode D1 is exceeded. When 6 Volts are dropped across resistor 45 as set by the Zener breakdown voltage value of diode D1, current flows through diode D1, through voltage divider resistor 41 turning on transistor Q2. The current flowing across the collector 65 emitter 70 junction thereby shunts diode D2 and turns-off transistor Q2. When transistor Q2 is turned-off, the overvoltage impressed on the input of the pre-regulator 25 is isolated from the output of the pre-regulator 25. Voltage comparator 43 senses the potential difference across source 105 and drain 100 when transistor Q2 is turned-off and in turn illuminates LED D4. The input to the pre-regulator 25 experiences a full-wave rectification waveform greater than the overvoltage threshold value. The pre-regulator 25 "switches", and thereby limits, the voltage as shown in FIG. 4E, which is output to storage capacitor 30 and the remainder of the electronic device. When the input voltage decreases in magnitude below the threshold value, transistor Q1 is turned-off and normal voltage operation of the circuit resumes. As the voltage increases again during the next cycle, the pre-regulation circuit is activated. When the pre-regulation circuit is active, the LED D4 illuminates, indicating that the line amplifier is experiencing an overvoltage condition. It should be apparent to those skilled in the art that the adaptive power direct current pre-regulator of the present invention provides a simple and inexpensive pre-regulating circuit. The pre-regulator performs both voltage regulation and over-voltage protection to permit continuous operation of the downstream electronic device, thereby providing distinct advantages over prior art devices.

The function of voltage comparator 43 and the LED D4 is to indicate that potentially lethal voltages exist at the input to the pre-regulator. Both components are not needed for the pre-regulator circuit to operate. Alternative embodiments of the present invention can have the overvoltage indicator placed at the input side of the circuit.

It should also be apparent to those skilled in the art that the adaptive power pre-regulator of the present invention is not limited to applications within the CATV industry. The invention may be utilized in any dc circuit to provide voltage regulation and overvoltage protection for downstream electronics. For example, the pre-regulator may be used in television sets, computer monitors, video tape recorders and other sensitive electronic equipment that would be damaged by extreme overvoltage conditions.

Although the invention has been described in part by making detailed reference to certain specific embodiments, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. An open-loop adaptive overvoltage pre-regulator circuit comprising:

a first switching means coupled directly in series with a first direct current leg of a full-wave rectifier and coupled directly in series with a terminal of a filter storage capacitor for electrically coupling said capacitor to said rectifier;

means for activating said first switching means during normal voltage operating conditions; and means for deactivating said first switching means without feedback during overvoltage operating conditions.

2. The adaptive power pre-regulator of claim 1 wherein said deactivating means is a second switching means.

3. The adaptive power pre-regulator of claim 2 wherein said means for activating said first switching means comprises:

a first current limiting resistor having first and second terminals;

a first voltage threshold means having first and second terminals;

said first current limiting resistor first terminal connected to a second direct current leg of said full-wave rectifier;

said first current limiting resistor second terminal connected at a first common electrical node to said first voltage threshold means first terminal, wherein said first common electrical node is connected to said first switching means; and said first voltage threshold means second terminal connected to said first direct current leg.

4. The adaptive power pre-regulator of claim 3 wherein said second switching means comprises:

a first voltage divider comprising second and third resistors connected at a second common electrical node, said first voltage divider being connected across said first and second direct current legs;

a second voltage threshold means having first and second terminals, said first terminal being connected to said second common electrical node;

a second voltage divider comprising fourth and fifth resistors connected at a third common electrical node, said second voltage divider connected between said second voltage threshold means second terminal and said first direct current leg;

a small signal transistor having a base, emitter and collector, said base being connected to said third common electrical node, said emitter being connected to said first direct current leg, and said collector being connected to said first common electrical node; and a protection diode having an anode connected to said first direct current leg and a cathode connected to said third common electrical node.

5. The adaptive power pre-regulator of claim 1 wherein said first switching means is a field effect transistor.

6. The adaptive power pre-regulator of claim 1 wherein said first switching means is a metal-oxide semiconductor field-effect transistor.

7. The adaptive power pre-regulator of claim 3 wherein said first voltage threshold means is a Zener diode.

8. The adaptive power pre-regulator of claim 4 wherein said second voltage threshold means is a Zener diode.

9. The adaptive power pre-regulator of claim 1 further including indicating means responsive to the activation of said first switching means.

10. The adaptive power pre-regulator of claim 9 wherein said indicating means is an LED.

11. The adaptive power pre-regulator of claim 1 wherein said pre-regulator is used within the power supply of a television receiver.

12. An open-loop adaptive overvoltage pre-regulator for connection to the output of a direct current source comprising:

a capacitor;

switching means for controlling the charging of said capacitor; and monitoring means for monitoring voltage output from the direct current source wherein said switching means is responsive to said monitoring means without feedback.

13. The pre-regulator of claim 12 wherein said switching means continuously provides voltage across said capacitor during normal voltage operating conditions.

14. The pre-regulator of claim 13 wherein said switching means periodically provides voltage across said capacitor during overvoltage operating conditions.

15. A cable television line device comprising:

means for receiving an input of a combined RF and Vac signal and outputting a Vac signal on a Vac output and a RF signal on a RF output;

a full-wave rectifier having an ac input coupled to said Vac output and two direct current leg outputs; and an open-loop adaptive overvoltage pre-regulator circuit coupled to said direct current leg outputs including:

a first switching means coupled directly in series with a first direct current leg output of said full-wave rectifier and coupled directly in series with a terminal of a filter storage capacitor for electrically coupling said capacitor to said rectifier;

means for activating said first switching means during normal voltage operating conditions; and means for deactivating said first switching means without feedback during overvoltage operating conditions.

16. The line device of claim 15 wherein said deactivating means is a second switching means.

17. The line device of claim 16 wherein said means for activating said first switching means comprises:

a first current limiting resistor having first and second terminals;

a first voltage threshold means having first and second terminals;

said first current limiting resistor first terminal connected to a second of said direct current leg outputs of said full-wave rectifier;

said first current limiting resistor second terminal connected at a first common electrical node to said first voltage threshold means first terminal, wherein said first common electrical node is connected to said first switching means; and said first voltage threshold means second terminal connected to said first direct current leg.

18. The line device of claim 17 wherein said second switching means comprises:

a first voltage divider comprising second and third resistors connected at a second common electrical node, said first voltage divider being connected across said first and second direct current legs;

a second voltage threshold means having first and second terminals, said first terminal being connected to said second common electrical node;

a second voltage divider comprising fourth and fifth resistors connected at a third common electrical node, said second voltage divider connected between said second voltage threshold means second terminal and said first direct current leg;

a small signal transistor having a base, emitter and collector, said base being connected to said third common electrical node, said emitter being connected to said first direct current leg, and said collector being connected to said first common electrical node; and a protection diode having an anode connected to said first direct current leg and a cathode connected to said third common electrical node.

19. The line device of claim 15 wherein said first switching means is a field effect transistor.

20. The line device of claim 15 wherein said first switching means is a metal-oxide semiconductor field-effect transistor.

21. The line device of claim 18 wherein said first voltage threshold means is a Zener diode and said second voltage threshold means is a Zener diode.

22. The line device of claim 15 further including indicating means responsive to the activation of said first switching means.

23. The line device of claim 22 wherein said indicating means is a light emitting diode.

24. The line device according to claim 15 wherein said device is a line amplifier and said RF signal from said RF signal output is amplified by said device.

* * * * *

UNITED STATES PATENT AND TRADEMARK OFFICE
CERTIFICATE OF CORRECTION

PATENT NO. : 5,708,574
DATED : January 13, 1998
INVENTOR(S) : Jeffrey S. Crompton It is certified that error appears in the above-identified patent and that said Letters Patent is hereby corrected as shown below:

At column 2, line 66, delete "No" and insert therefor --The circuit is of an open-loop design, since no--.

At column 5, line 4, after "comprising resistors", insert --41,--.

Signed and Sealed this

Twenty-first Day of April, 1998

Attest:

BRUCE LEHMAN

*Attesting Officer*

*Commissioner of Patents and Trademarks*